April 3, 1951          H. R. RICH          2,547,094
ELECTRIC HAND SPRAYER
Filed April 26, 1949
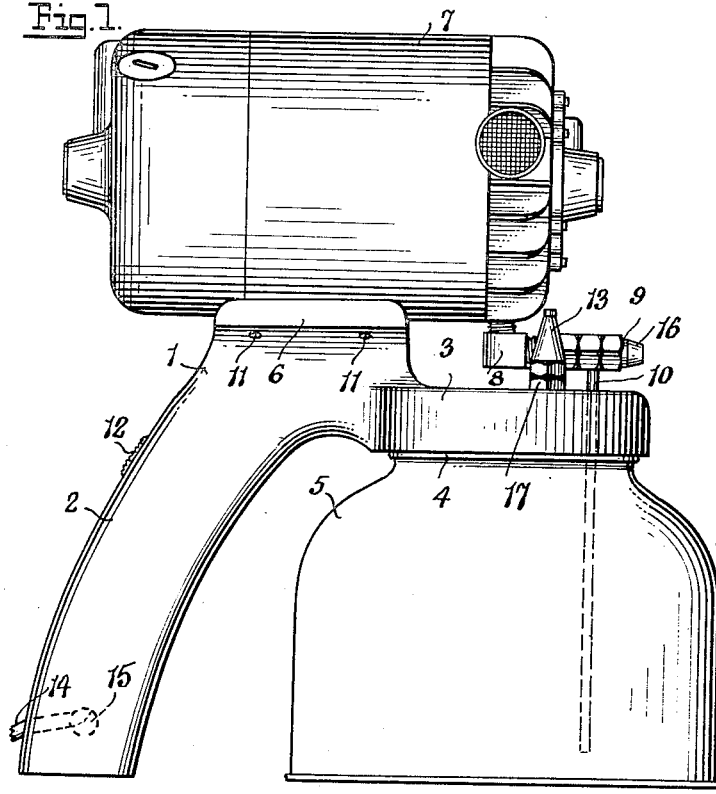
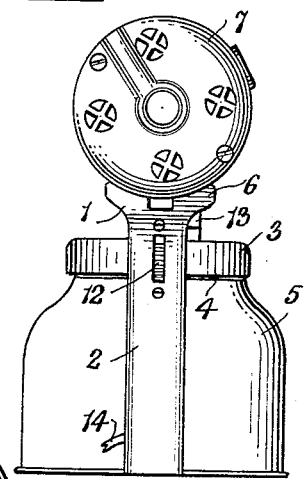
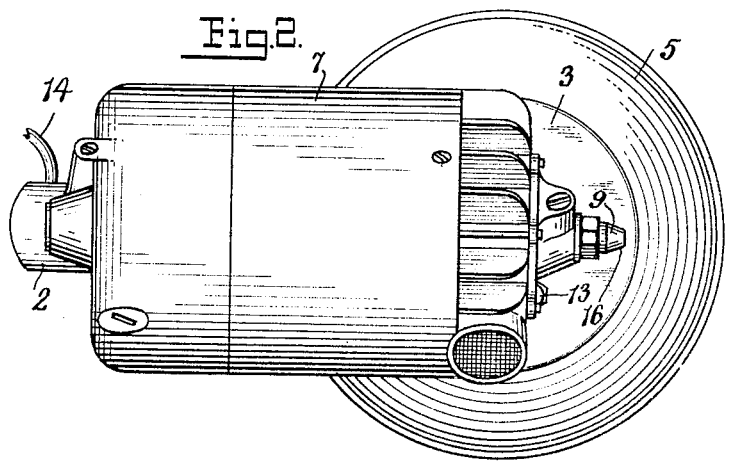
INVENTOR.
Hyman Richard Rich
BY Joseph J. Juhasz
his Attorney Patented Apr. 3, 1951

2,547,094

UNITED STATES PATENT OFFICE 2,547,094

ELECTRIC HAND SPRAYER

Hyman Richard Rich, New York, N. Y., assignor to West Disinfecting Company, Long Island City, N. Y.

Application April 26, 1949, Serial No. 89,761

1 Claim. (Cl. 299—88)

This invention relates to spraying devices, and more particularly to the type employed for the spraying of liquid insecticides and similar liquid preparations.

An object of the invention is to provide a device of this character in which the air blast is developed by a suitable blower or electrically driven compressor so that a constant and uniform air blast is attained and the spray directed from the sprayer will be finely diffused and cover an extensive area.

Another object of the invention is to provide a sprayer of this character which can be hand-held and thus easily directed wherever desired. The operation of the blast-creating motor is controlled by a switch embodied in the handle of the device and complete control of the spraying action is thus afforded.

The invention further contemplates the provision of a compact, portable, hand-held, electrically-operated sprayer in which a continuous and uninterrupted spraying action is secured, is readily controlled and the device easily handled and directed.

More particularly, the invention contemplates the provision of a handle formed with a forwardly extended disk-shaped cap portion in which the liquid-holding container is mounted; the handle having a raised support or cradle on which the blower is mounted, the latter consisting of an electric motor and fan and an air outlet in communication with an air nozzle, the latter being located above the cap and having a downwardly extending siphon tube extending through the cap and into the liquid container.

These and other objects are attained by the invention, a more particular description of which will hereinafter appear and be set forth in the claim appended hereto.

In the accompanying drawings, wherein an illustrative embodiment of the invention is disclosed, Fig. 1 is a side elevation of the improved sprayer, constructed in accordance with the invention; Fig. 2 is a top plan view of the same, and Fig. 3 is a view looking at the rear of the sprayer, the same being shown on a reduced scale.

Referring to the drawing, I indicates generally the supporting frame for the sprayer, the same being provided with an integrally-formed hollow handle portion 2 suitably shaped to be conveniently held in the hand. The frame includes a forwardly extending disk-shaped cap member 3 which is either internally threaded or provided internally with a threaded closure cap 4 which threadably receives the neck portion of the insecticide-containing receptacle 5. Rising from the top of the handle 2, and located slightly to the rear of the disk-shaped member 3 is an arcuately-curved cradle 6 constituting a support for the electric motor 7 to which the cradle 6 is attached by screws shown at 11.

The motor 7 of known construction is supplied with current by the cable 14 which enters into the interior of the hollow handle 2 through the side opening 15 therein, to be connected to the motor in the conventional manner. A switch 12 is mounted to the handle and is accessible at the rear of the same, as clearly seen in Figs. 1 and 3, and the same being connected in the electric circuit to the motor, controls the flow of current to the motor. Included within the motor casing is a fan or blower of known construction and therefore not shown in detail. It is sufficient to state that while the motor is in operation, a continuous blast of air is directed through the outlet 8 and out of a spray nozzle shown at 9. The spray nozzle 9 is protected by having its forward end located inwardly of the peripheral edge of the disk-shaped cap member 3. A siphon tube 10 is in communication with the interior of the nozzle and is carried thereby, said tube extending downwardly through the cap member 3 to enter into the interior of the receptacle 5 as shown in dotted lines in Fig. 1.

The nozzle 9 may be made in various forms and constructions, and has a tip portion 16 of the thread-on type which is readily removable. An additional nozzle shown at 13 may be carried on a stud 17 located on top of the cap member 3, said nozzle 13 constituting a spare or substitute nozzle to be fitted in place of that shown at 16 when different spraying effects are desired. When mounted on the stud in the position shown in Fig. 1, the nozzle 13 does not, of course, communicate with the interior of the receptacle 5, but is merely mounted on top of the cap 3.

From the foregoing, the operation of the improved spraying device will be readily understood. When the motor is set in operation by means of the switch 12, the air blast emanating from the nozzle 16 will project a continuous, finely-diffused mist from the fluid drawn up through the suction tube 10 in the known manner of sprayers. The device may be made light-weight, readily portable and useful under all spraying conditions. The making of the handle, closure cap for the fluid container, and cradle support for the motor in one piece makes the assembly of the device simple and expedient and substantially trouble-free. It will also be noted that the lower end of the handle is on a horizontal line with the bottom of the liquid container 5 so that when the device is placed upon a flat surface, it will rest not only upon the bottom of the container 5 but upon the bottom of the handle 2 as well, thus maintaining the device against readily upsetting or toppling over.

Having described one embodiment of the invention, it is obvious that the same is not to be restricted thereto, but is broad enough to cover all structures coming within the scope of the annexed claim.

What I claim is:

A sprayer having a handle, said handle being formed with a forwardly-extended disk-shaped head, said head fitting over and constituting a top closure for a liquid container held below it, the lower end of the liquid container and the bottom of the handle being on the same horizontal line whereby the sprayer will rest upon the bottom of the container and the end of the handle when the sprayer is placed on a flat surface, the handle being provided at the top with a cradle elevated above the disk-shaped head, an electrically-operated compressor supported on the cradle with its axis horizontal and having a forward end extended over the top of the disk-shaped head, the compressor having an air outlet, an air nozzle secured on and projecting from the air outlet and extending horizontally and located over the head and having its forward end located inwardly of the edge of the disk-shaped head, and a suction tube extending downwardly from the air nozzle and passing through the head and entering into the liquid container.

HYMAN RICHARD RICH.

REFERENCES CITED

The following references are of record in the file of this patent:

UNITED STATES PATENTS

| Number | Name | Date |
|---|---|---|
| 1,881,569 | Hermann | Oct. 11, 1932 |
| 1,881,570 | Hermann | Oct. 11, 1932 |
| 1,899,749 | Deutsch | Feb. 28, 1933 |
| 1,911,603 | Breuer | May 30, 1933 |

FOREIGN PATENTS

| Number | Country | Date |
|---|---|---|
| 294,177 | Italy | Mar. 14, 1932 |
| 752,600 | France | July 24, 1933 |